(12) United States Patent  
Chen et al.

(10) Patent No.: US 11,168,975 B2  
(45) Date of Patent: Nov. 9, 2021

(54) PHASE DELAY EXTRACTION AND COMPENSATION METHOD IN PGC PHASE DEMODULATION TECHNOLOGY

(71) Applicant: ZHEJIANG SCI-TECH UNIVERSITY, Zhejiang (CN)

(72) Inventors: Benyong Chen, Zhejiang (CN); Jiandong Xie, Zhejiang (CN); Liping Yan, Zhejiang (CN)

(73) Assignee: ZHEJIANG SCI-TECH UNIVERSITY, Zhejiang (CN)

( * ) Notice: Subject to any disclaimer, the term of this patent is extended or adjusted under 35 U.S.C. 154(b) by 0 days.

(21) Appl. No.: 16/868,550

(22) Filed: May 7, 2020

(65) Prior Publication Data

US 2020/0263973 A1 Aug. 20, 2020

Related U.S. Application Data

(63) Continuation-in-part of application No. PCT/CN2019/070333, filed on Jan. 4, 2019.

(30) Foreign Application Priority Data

Nov. 15, 2018 (CN) .......................... 201811358943.6

(51) Int. Cl.  
 *G01B 9/02* (2006.01)

(52) U.S. Cl.  
 CPC ....... *G01B 9/02067* (2013.01); *G01B 9/0201* (2013.01); *G01B 9/02072* (2013.04); *G01B 9/02083* (2013.01)

(58) Field of Classification Search  
 CPC .............. G01B 9/0201; G01B 9/02067; G01B 9/02072; G01B 9/02083  
 See application file for complete search history.

(56) References Cited

U.S. PATENT DOCUMENTS

2011/0134984 A1* 6/2011 Seo ..................... G01B 9/02084  
 375/226  
2013/0265586 A1* 10/2013 Ohara ................ G01B 9/02067  
 356/498

(Continued)

FOREIGN PATENT DOCUMENTS

| CN | 105043243 | 11/2015 |
| CN | 107843189 | 3/2018 |
| EP | 1985967 | 10/2008 |

*Primary Examiner* — Michael A Lyons  
(74) *Attorney, Agent, or Firm* — JCIPRNET

(57) ABSTRACT

The disclosure discloses a phase delay extraction and compensation method in a PGC phase demodulation technology. The sinusoidal phase modulation interference signal is converted into a digital interference signal by an analog-to-digital converter after amplification and filtering, and the digital interference signal is subjected to orthogonal downmixing of first-order, second-order, and fourth-order harmonics simultaneously to obtain three pairs of orthogonal harmonic amplitude signals. The three pairs of orthogonal harmonic amplitude signals are used to extract phase delay, and the result is used to calculate the corresponding phase delay correction coefficients, and the phase delay correction coefficient are multiplied by the corresponding absolute harmonic amplitude signal equal to the sum of the absolute value of the orthogonal harmonic amplitude signals to obtain a new harmonic amplitude signal that is not affected by the phase delay, then the phase to be measured is obtained through the arc tangent operation.

5 Claims, 3 Drawing Sheets

(56) References Cited

U.S. PATENT DOCUMENTS

2018/0224266 A1\* 8/2018 Perea ................. G01B 9/02022
2018/0328710 A1\* 11/2018 Yan .......................... G01B 9/02
2019/0368860 A1\* 12/2019 Yan ....................... H04L 27/233

\* cited by examiner

PHASE DELAY EXTRACTION AND COMPENSATION METHOD IN PGC PHASE DEMODULATION TECHNOLOGY

CROSS-REFERENCE TO RELATED APPLICATION

This application is a continuation in part of international PCT application serial no. PCT/CN2019/070333, filed on Jan. 4, 2019, which claims the priority benefit of China application no. 201811358943.6, filed on Nov. 15, 2018. The entirety of each of the above-mentioned patent applications is hereby incorporated by reference herein and made a part of this specification.

BACKGROUND

Technical Field

The disclosure belongs to the technical field of laser interference measurement, in particular to a phase delay extraction and compensation method in a PGC phase demodulation technology.

Description of Related Technology

Phase generation carrier (PGC) modulation and demodulation technology is widely used in interference fiber optic sensors and sinusoidal phase modulation interferometers due to its high phase measurement sensitivity and large dynamic range. PGC modulation and demodulation technology includes differential cross-multiplication algorithm (PGC-DCM) and arc tangent algorithm (PGC-Arctan). The PGC-DCM method obtains the phase to be measured through operations such as performing differential cross-multiplication algorithm and integration on orthogonal components. This method is easily affected by laser light intensity, carrier phase delay, and phase modulation depth. The PGC-Arctan method directly obtains the phase to be measured by performing division and arc tangent algorithm on orthogonal components, and the measurement result is not affected by light intensity, but the result is still affected by the phase delay and modulation depth. Phase delay compensation is a prerequisite for achieving modulation depth compensation. In order to accurately obtain the phase to be measured, the phase delay is usually adjusted to zero to achieve phase delay compensation. In practice, there is a drift in the phase delay, and it is difficult to achieve real-time compensation for the phase delay with the existing methods. When the phase delay deviates from zero, a non-linear error will occur, which limits the improvement of phase measurement accuracy. In addition, when the phase delay is equal to specific angle, some harmonic amplitude signals will be always equal to zero, which will cause both the PGC-DCM and PGC-Arctan algorithms to fail to calculate the phase to be measured. Therefore, accurately extracting and compensating for the phase delay in the PGC phase demodulation algorithm is a key technical problem that needs to be solved to improve the accuracy and precision of sinusoidal modulation interference measurement.

SUMMARY

In order to solve the problems in the related technology, the present disclosure discloses a phase delay extraction and compensation method in a PGC phase demodulation technology. The present disclosure solves the difficulty in accurately measuring the phase delay in a sinusoidal modulation interferometer and the problem of suppressing the non-linear error caused by the phase delay in real time.

The technical solution adopted by the present disclosure to solve its technical problems includes the following steps:

Step 1) The DC component and high-frequency noise in the sinusoidal phase modulation interference signal are removed by a band-pass filter, and then the filtered sinusoidal phase modulation interference signal is converted into a digital signal S(t) by analog-to-digital conversion, wherein the sampling frequency is 8 times higher than the frequency of the sinusoidal modulation signal. The sinusoidal modulation signal refers to the modulation signal for sinusoidal phase modulation. The digital signal S(t) is expressed as follows:

$$S(t) = A\cos(\varphi)\left\{J_0(m) + 2\sum_{n=1}^{\infty} J_{2n}(m)\cos[2n(\omega_c t + \theta)]\right\} - A\sin(\varphi)\left\{2\sum_{n=1}^{\infty} J_{2n-1}(m)\sin[(2n-1)(\omega_c t + \theta)]\right\}$$

Specifically, A represents the amplitude of the digital interference signal, m represents the modulation depth, $\theta$ represents the phase delay, $\omega_c$ represents the frequency of the sinusoidal modulation signal, $\varphi$ represents the phase to be measured, and $J_0(m)$ represents the $0^{th}$-order Bessel Function of the first kind, $J_{2n}(m)$ represents the even-order Bessel function of the first kind, and $J_{2n-1}(m)$ represents the odd-order of Bessel function of the first kind;

Step 2) The digital interference signal S(t) is multiplied with the first-order orthogonal reference signal ($\sin(\omega_c t)$, $\cos(\omega_c t)$) generated by the first digital frequency synthesizer, the second-order orthogonal reference signal ($\cos(2\omega_c t)$, $\sin(2\omega_c t)$) generated by the second digital frequency synthesizer, the fourth-order orthogonal reference signal ($\cos(4\omega_c t)$, $\sin(4\omega_c t)$) generated by the third digital frequency synthesizer respectively through a multiplier and subjected to a low-pass filtering process to complete the orthogonal down-mixing operation. The DC signal output by each filter is proportional to the amplitude of the corresponding harmonic in the digital interference signal S(t) and is defined as a harmonic amplitude signal. The same order harmonic amplitude signal is defined as the signal $P_i$ and $Q_i$ respectively depending on whether it is proportional to the cosine of the phase delay $\theta$ or proportional to the sine of the phase delay $\theta$; that is, $P_i$ and $Q_i$ are orthogonal, wherein the subscript i represents the order, and the value range is 1, 2 and 4, which are respectively named as first-order orthogonal harmonic amplitude signals ($P_1$, $Q_1$), second-order orthogonal harmonic amplitude signals ($P_2$, $Q_2$) and fourth-order orthogonal harmonic amplitude signals ($P_4$, $Q_4$), and $P_1$, $Q_1$, $P_2$, $Q_2$, $P_4$, $Q_4$ are calculated as:

$P_1 = -LPF[S(t)\cdot\sin(\omega_c t)] = AJ_1(m)\cos(\theta)\sin(\varphi)$ $Q_1 = -LPF[S(t)\cdot\cos(\omega_c t)] = AJ_1(m)\sin(\theta)\sin(\varphi)$ $P_2 = +LPF[S(t)\cdot\cos(2\omega_c t)] = AJ_2(m)\cos(2\theta)\cos(\varphi)$ $Q_2 = -LPF[S(t)\cdot\sin(2\omega_c t)] = AJ_2(m)\sin(2\theta)\cos(\varphi)$ $P_4 = +LPF[S(t)\cdot\cos(4\omega_c t)] = AJ_4(m)\cos(4\theta)\cos(\varphi)$ $Q_4 = -LPF[S(t)\cdot\sin(4\omega_c t)] = AJ_4(m)\sin(4\theta)\cos(\varphi)$ Specifically, LPF[ ] represents the low-pass filtering operation, A represents the amplitude of the digital interference signal, m represents the modulation depth, θ represents the phase delay, φ represents the phase to be measured, and $J_1(m)$ represents the first-order Bessel Function of the first kind, $J_2(m)$ represents the second-order Bessel function of the first kind, $J_4(m)$ represents the fourth-order Bessel function of the first kind; $\omega_c$ represents the frequency of the sinusoidal modulation signal;

Step 3) The first-order orthogonal harmonic amplitude signals ($P_1$, $Q_1$), the second-order orthogonal harmonic amplitude signals ($P_2$, $Q_2$), and the fourth-order orthogonal harmonic amplitude signals ($P_4$, $Q_4$) are utilized for calculation to obtain the phase delay amount $\theta_c$ that is not affected by the phase φ to be measured. The calculation formula is as follows:

$$\theta_c = \frac{1}{2}\arctan\frac{2P_1Q_1 + (P_2Q_4 - Q_2P_4)}{(P_1^2 - Q_1^2) + (P_2P_4 + Q_2Q_4)}$$

$$= \frac{1}{2}\arctan\frac{A^2[J_1^2(m)\sin^2(\varphi) + J_2(m)J_4(m)\cos^2(\varphi)]\sin 2\theta}{A^2[J_1^2(m)\sin^2(\varphi) + J_2(m)J_4(m)\cos^2(\varphi)]\cos 2\theta}$$

$$= \frac{1}{2}\arctan\frac{\sin 2\theta}{\cos 2\theta}$$

Specifically, it is assumed that the actual phase delay value is in the range of −π to π, the relationship between the phase delay amount $\theta_c$ extracted using the above formula and the actual phase delay amount θ is $\theta = \theta_c + k\pi$ (k=−1, 0, 1).

Step 4) The first-order orthogonal harmonic amplitude signals ($P_1$, $Q_1$) and the second-order orthogonal harmonic amplitude signals ($P_2$, $Q_2$) are respectively added by the absolute value adder to obtain the absolute harmonic amplitude signal of which the amplitude is not zero without the limitation of the phase delay. $T_1$ and $T_2$ respectively represent the sum of the absolute values of the first-order orthogonal harmonic amplitude signals $P_1$ and $Q_1$ and the sum of the absolute values of the second-order orthogonal harmonic amplitude signals $P_2$ and $Q_2$. The sum is calculated as follows:

$$T_1 = |Q_1| + |P_1| = AJ_1(m)(|\sin(\theta)| + |\cos(\theta)|)|\sin(\varphi)|$$

$$T_2 = |Q_2| + |P_2| = AJ_2(m)(|\sin(2\theta)| + |\cos(2\theta)|)|\cos(\varphi)|$$

Step 5) The phase delay amount $\theta_c$ obtained in step 3) is utilized to calculate the first-order absolute harmonic amplitude signal phase delay correction coefficient $G_1$ and the second-order absolute harmonic amplitude signal phase delay correction coefficient $G_2$ respectively. The calculation formula is as follows:

$$G_1 = \frac{\text{sign}(P_1)}{|\sin(\theta_c)| + |\cos(\theta_c)|}$$

$$G_2 = \frac{\text{sign}(P_2)}{|\sin(2\theta_c)| + |\cos(2\theta_c)|}$$

Specifically, sign($P_1$) and sign($P_2$) represent the signs of $P_1$ and $P_2$, respectively;

Step 6) The absolute harmonic amplitude signals are respectively multiplied by the corresponding phase delay correction coefficients $G_1$ and $G_2$, respectively, to reconstruct the new harmonic amplitude signals of which amplitude is not affected by the phase delay. $R_1$ and $R_2$ respectively represent the product of the absolute harmonic amplitude signal $T_1$ and the phase delay correction coefficient $G_1$ as well as the product of the absolute harmonic amplitude signal $T_2$ and the phase delay correction coefficient $G_2$. The reconstruction calculation formula is as follows:

$$R_1 = G_1T_1 = AJ_1(m)\sin(\varphi)$$

$$R_2 = G_2T_2 = AJ_2(m)\cos(\varphi)$$

Step 7) Assume that the modulation depth is m=2.63, and $J_1(m)=J_2(m)$; perform the quadrant arc tangent operation on the new harmonic amplitude signal to obtain the phase to be measured. The formula is as follows:

$$\varphi = \begin{cases} \arctan\frac{R_1}{R_2}, & \text{sign}(R_2) \geq 0 \\ \arctan\frac{R_1}{R_2} - \pi, & \text{sign}(R_2) < 0, \text{sign}(R_1) < 0 \\ \arctan\frac{R_1}{R_2} + \pi, & \text{sign}(R_2) < 0, \text{sign}(R_1) \geq 0 \end{cases}$$

Specifically, sign($R_1$) and sign($R_2$) represent the signs of $R_1$ and $R_2$, respectively;

The calculation process of the method adopts a phase processing system which is specifically as follows:

Input terminals of the first multiplier, the second multiplier, the fifth multiplier, the sixth multiplier, the seventh multiplier, and the eighth multiplier are all connected to the digital interference signal S(t), and the first digital frequency synthesizer is connected to the input terminals of the first multiplier and the second multiplier, the second digital frequency synthesizer is connected to the input terminals of the fifth multiplier and the sixth multiplier, and the third digital frequency synthesizer is connected to the input terminals of the seventh multiplier and the eighth multiplier. The output terminal of the first multiplier is connected to the input terminal of the first absolute value adder and the input terminal of the phase delay extraction module respectively through the first low-pass filter, the output terminal of the second multiplier is connected to the input terminal of the first absolute value adder and the input terminal of the phase delay extraction module respectively through the second low-pass filter, the output terminal of the fifth multiplier is connected to the input terminal of the second absolute value adder and the input terminal of the phase delay extraction module respectively through the third low-pass filter, the output terminal of the sixth multiplier is connected to the input terminal of the second absolute value adder and the input terminal of the phase delay extraction module respectively through the fourth low-pass filter, and the output terminals of the seventh and the eight multipliers are respectively connected to the input terminal of the phase delay extraction module through the fifth low-pass filter and the sixth low-pass filter respectively. The output terminal of the phase delay extraction module is connected to the input terminal of the phase delay correction coefficient calculation module, the output terminal of the first absolute value adder and the output terminal of the phase delay correction coefficient calculation module are connected to the input terminal of the first arc tangent operator through the third multiplier, the output terminal of the second absolute value adder and the output terminal of the phase delay correction coefficient calculation module are connected to the input terminal of the first arc tangent operator through the fourth multiplier, and the output terminal of the first arc tangent operator outputs the phase to be measured.

The phase delay extraction module is specifically as: the input terminal of the ninth multiplier is respectively connected to the output terminals of the first low-pass filter and the second low-pass filter, the output terminal of the first low-pass filter is also connected to the input terminal of the first squarer, and the output terminal of the ninth multiplier is connected to the input terminal of the first adder through a multiplier; the output terminal of the second low-pass filter is also connected to the input terminal of the second squarer, and the output terminal of the second squarer and the output terminal of the first squarer are connected to the input terminal of the second adder through the first subtractor; the input terminal of the thirteenth multiplier is connected to the output terminals of the third low-pass filter and the sixth low-pass filter respectively, the input terminal of the twelfth multiplier is connected to the output terminals of the fourth low-pass filter and the fifth low-pass filter respectively, the output terminals of the twelfth multiplier and the thirteenth multiplier are connected to the input terminal of the first adder through the second subtractor; the input terminal of the tenth multiplier is connected to the output terminals of the third low-pass filter and the fifth low-pass filter respectively, the input terminal of the eleventh multiplier is connected to the output terminals of the fourth low-pass filter and the sixth low-pass filter respectively, the output terminals of the tenth multiplier and the eleventh multiplier are connected to the input terminal of the second adder through the third adder; and the output terminals of the first adder and the second adder are connected to the input terminal of the second arc tangent operator. The output terminal of the second arc tangent operator is divided into two paths. The first branch is output to the phase delay correction coefficient calculation module through a halve operator, and the second branch directly outputs the result to the phase delay correction coefficient calculation module.

The phase delay correction coefficient calculation module is specifically as: the output terminal of the second half of the multiplier of the first branch of the second arc tangent operator obtains a sine value and a cosine value through a first cosine lookup table, and the two values are connected to the input terminal of the first sign multiplier through the third absolute value adder and the first reciprocal operator. The first sign multiplier preforms calculation on the output value from the first reciprocal operator and the output value obtained by the second low-pass filter through the first sign operator to output the operation result. The output terminal of the second branch of the second arc tangent operator obtains a sine value and a cosine value through a second cosine lookup table. The two values are sequentially connected to the input terminal of the second sign multiplier through the fourth absolute value adder and the second reciprocal operator. The second sign multiplier performs calculation on the output value from the second reciprocal operator and the output value obtained by the third low-pass filter through the second sign operator to output the operation result.

The method is applied to a sinusoidal phase modulation interferometer. The sinusoidal phase modulation interferometer includes a single-frequency laser, a polarizer, a beam splitting prism, a measuring cube prism, an electro-optic phase modulator, a photodetector, and a high-voltage amplifier. The laser beam emitted from the single-frequency laser passes through the polarizer and then reflected and transmitted by the beam splitting prism. The reflected light is modulated by the electro-optic phase modulator and then reflected by the reference cube prism. The transmitted light is reflected by the measuring cube prism and then returns to the beam splitting prism. After returning to the beam splitting prism, the two beams are converged and then reflected by the reflecting mirror to the photodetector. The photodetector generates an electrical signal after receiving the beam, the electrical signal is input to a field programmable gate array signal processor (FPGA) through an amplifier, a band-pass filter and an analog-to-digital converter in sequence. The field programmable gate array signal processor (FPGA) outputs a sinusoidal modulation signal, which is input to the input terminal of the electro-optic phase modulator through the digital-to-analog converter and high-voltage amplifier in sequence.

The reference cube prism is fixed, and the measuring cube prism is fixed on the object to be measured.

Compared with the related technology, the present disclosure has the following advantageous effects:

(1) The method of the present disclosure uses first-order, second-order, and fourth-order orthogonal harmonic amplitude signals to extract the phase delay, which is not affected by the phase to be measured, and can realize real-time extraction of phase delay, thereby achieving real-time compensation of phase delay;

(2) The method of the present disclosure uses first-order, second-order, and fourth-order orthogonal harmonic amplitude signals to construct absolute harmonic amplitude signals of which the amplitude is not zero without the limitation of the phase delay, thereby solving the problem that the phase to be measured cannot be measured when the phase delay is at a specific angle;

(3) The present disclosure uses the phase delay to calculate the corresponding phase delay correction coefficients to compensate for the effect caused by the phase delay, eliminates the non-linear error caused by the phase delay, improves the phase measurement accuracy, and can be widely applied in technology field of sinusoidal modulation interference.

Figure 1:
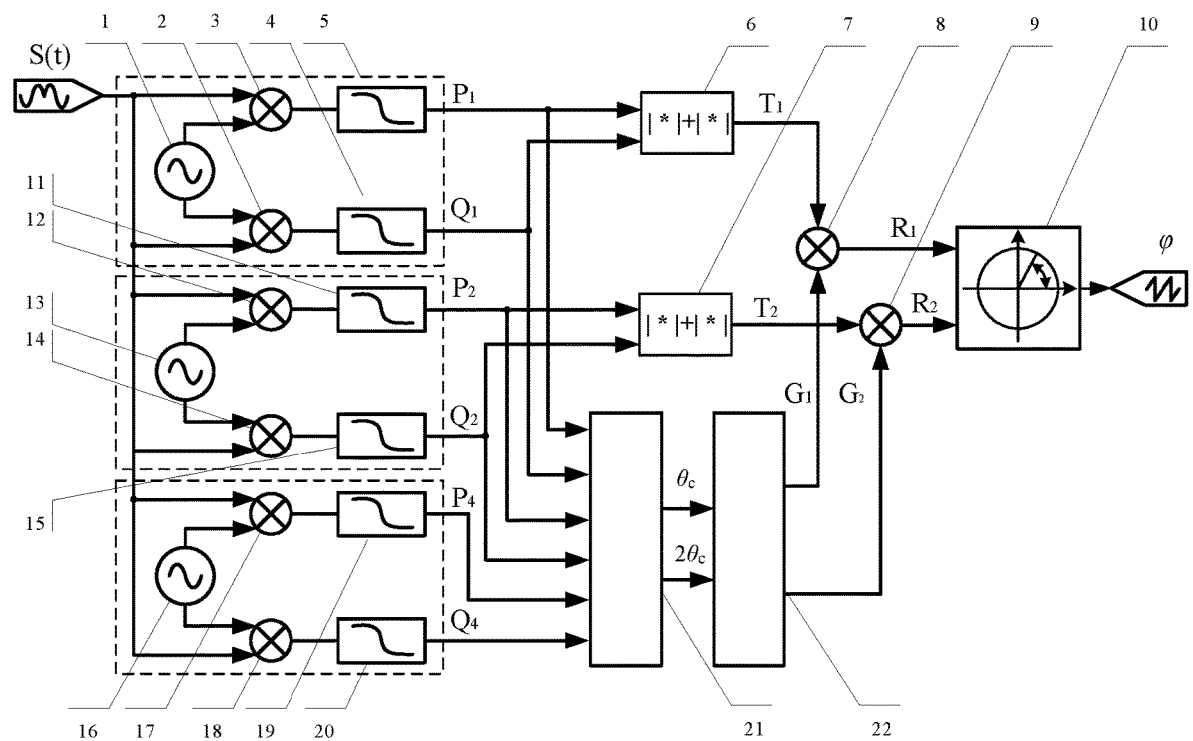
FIG. 1 is a principle block diagram of the phase delay extraction and compensation method in the PGC phase demodulation technology.

In the drawings: 1, first digital frequency synthesizer; 2, first multiplier; 3, second multiplier; 4, first low-pass filter; 5, second low-pass filter; 6, first absolute value adder; 7, second absolute value adder; 8, third multiplier; 9, fourth multiplier; 10, first arc tangent operator; 11, third low-pass filter; 12, fifth multiplier; 13, second digital frequency synthesizer; 14, sixth multiplier; 15, fourth low-pass filter; 16, third digital frequency synthesizer; 17, seventh multiplier; 18, eighth multiplier; 19, fifth low-pass filter; 20, sixth low-pass filter; 21, phase delay extraction module; 22, phase delay correction coefficient calculation module; 23, single-frequency laser; 24, polarizer; 25, beam splitting prism; 26, reference cube prism; 27, electro-optic phase modulator; 28, high-voltage amplifier; 29, measuring cube prism; 30, reflecting mirror; 31, photoelectric detector; 32, amplifier; 33, band-pass filter; 34, analog-to-digital converter; 35, field programmable gate array signal processor FPGA; 36, digital-to-analog converter; 2101, ninth multiplier; 2102, times multiplier; 2103, first squarer; 2104, second squarer; 2105, first subtractor; 2106, first adder; 2107, second adder; 2108, second arc tangent operator; 2109, halve operator; 2110, tenth multiplier; 2111, eleventh multiplier; 2112, third adder; 2113, twelfth multiplier; 2114, thirteenth multiplier; 2115, second subtractor; 2201, first cosine lookup table; 2202, third absolute value adder; 2203, first sign operator; 2204, first reciprocal operator; 2205, first sign multiplier; 2206, second cosine lookup table; 2207, fourth absolute value adder; 2208, second sign operator; 2209, second reciprocal operator; 2210, second sign multiplier.

DESCRIPTION OF THE EMBODIMENTS

The present disclosure is described in details below with reference to the accompanying drawings and the embodiments.

As shown in FIG. 1, the specific implementation adopts the following phase processing system: input terminals of the first multiplier 2, the second multiplier 3, the fifth multiplier 12, the sixth multiplier 14, the seventh multiplier 17, and the eighth multiplier 18 are all connected to the digital interference signal S(t). The first digital frequency synthesizer 1 is connected to the input terminals of the first multiplier 2 and the second multiplier 3. The second digital frequency synthesizer 13 is connected to input terminals of the fifth multiplier 12 and the sixth multiplier 14. The third digital frequency synthesizer 16 is connected to the input terminals of the seventh multiplier 17 and the eighth multiplier 18.

The output terminal of the first multiplier 2 is connected to the input terminal of the first absolute value adder 6 and the input terminal of the phase delay extraction module 21 respectively through the first low-pass filter 4, and the output terminal of the second multiplier 3 is connected to the input terminal of the first absolute value adder 6 and the input terminal of the phase delay extraction module 21 respectively through the second low-pass filters 5. The output terminal of the fifth multiplier 12 is connected to the input terminal of the second absolute value adder 7 and the input terminal of the phase delay extraction module 21 respectively through the third low-pass filter 11. The output terminal of the sixth multiplier 14 is connected to the input terminal of the second absolute value adder 7 and the input terminal of the phase delay extraction module 21 respectively through the fourth low-pass filter 15. The output terminals of the seventh multiplier 17 and the eighth multiplier 18 are respectively connected to the input terminal of the phase delay extraction module 21 through the fifth low-pass filter 19 and the sixth low-pass filter 20.

The output terminal of the phase delay extraction module 21 is connected to the input terminal of the phase delay correction coefficient calculation module 22. The output terminal of the first absolute value adder 6 and the output terminal of the phase delay correction coefficient calculation module 22 are connected to the input terminal of the first arc tangent operator 10 through the third multiplier 8. The output terminal of the second absolute value adder 7 and the output terminal of the phase delay correction coefficient calculation module 22 are connected to the input terminal of the first arc tangent operator 10 through the fourth multiplier 9. The output terminal of the first arc tangent operator 10 outputs the phase to be measured.

The principle of the implementation process of the present disclosure is as follows:

After obtaining the digital signal S(t), the orthogonal frequency down-conversion is performed first, specifically as follows. The digital interference signal S(t) is multiplied by the first-order orthogonal reference signal generated by the first digital frequency synthesizer 1 through the first multiplier 2 and the second multiplier 3, after being filtered by the first low-pass filter 4 and the second low-pass filter 5, the first-order orthogonal harmonic amplitude signals ($Q_1$, $P_1$) are obtained. Likewise, the digital interference signal S(t) is multiplied by the second-order orthogonal reference signal generated by the second digital frequency synthesizer 13 through the fifth multiplier 12 and the sixth multiplier 14, after being filtered by the third low-pass filter 11 and the fourth low-pass filter 14, the second-order orthogonal harmonic amplitude signals ($P_2$, $Q_2$) are obtained. Likewise, the digital interference signal S(t) is multiplied by the fourth-order orthogonal reference signal generated by the third digital frequency synthesizer 16 through the seventh multiplier 17 and the eighth multiplier 18, after being filtered by the fifth low-pass filter 19 and the fourth low-pass filter 20, the fourth-order orthogonal harmonic amplitude signals ($P_4$, $Q_4$) are obtained. Then, the quadrature frequency down-conversion is completed, and the formulas are as follows:

$$Q_1 = -LPF[S(t) \cdot \cos(\omega_c t)] = AJ_1(m)\sin(\theta)\sin(\varphi)$$

$$P_1 = -LPF[S(t) \cdot \sin(\omega_c t)] = AJ_1(m)\cos(\theta)\sin(\varphi)$$

$$P_2 = +LPF[S(t) \cdot \cos(2\omega_c t)] = AJ_2(m)\cos(2\theta)\cos(\varphi)$$

$$Q_2 = -LPF[S(t) \cdot \sin(2\omega_c t)] = AJ_2(m)\sin(2\theta)\cos(\varphi)$$

$$P_4 = +LPF[S(t) \cdot \cos(4\omega_c t)] = AJ_4(m)\cos(4\theta)\cos(\varphi)$$

$$Q_4 = -LPF[S(t) \cdot \sin(4\omega_c t)] = AJ_4(m)\sin(4\theta)\cos(\varphi)$$

Specifically, A represents the amplitude of the interference signal, m represents the modulation depth, $\theta$ represents the phase delay, $\varphi$ represents the phase to be measured, $J_1(m)$ represents the first-order Bessel function of the first kind, $J_2(m)$ represents the second-order Bessel functions of the first kind, $J_4(m)$ represents the fourth-order Bessel functions of the first kind;

The phase delay extraction module 21 utilizes the three pairs of orthogonal harmonic amplitude signals ($Q_1$, $P_1$), ($Q_2$, $P_2$) and ($Q_4$, $P_4$) to extract the phase delay amount $\theta_c$, and the formula is as follows:

$$\theta_c = \frac{1}{2}\arctan\frac{2P_1Q_1 + (P_2Q_4 - Q_2P_4)}{(P_1^2 - Q_1^2) + (P_2P_4 + Q_2Q_4)}$$
$$= \frac{1}{2}\arctan\frac{A^2[J_1^2(m)\sin^2(\varphi) + J_2(m)J_4(m)\cos^2(\varphi)]\sin 2\theta}{A^2[J_1^2(m)\sin^2(\varphi) + J_2(m)J_4(m)\cos^2(\varphi)]\cos 2\theta}$$
$$= \frac{1}{2}\arctan\frac{\sin 2\theta}{\cos 2\theta}$$

The phase delay correction coefficient calculation module 22 utilizes the extracted phase delay amount $\theta_c$ to calculate a first-order phase delay correction coefficient $G_1$ and a second-order phase delay correction coefficient $G_2$, and the formula is as follows:

$$G_1 = \frac{\text{sign}(P_1)}{|\sin(\theta_c)| + |\cos(\theta_c)|} = \frac{\text{sign}(P_1)}{|\sin(\theta)| + |\cos(\theta)|}$$

-continued $$G_2 = \frac{\text{sign}(P_2)}{|\sin(2\theta_c)| + |\cos(2\theta_c)|} = \frac{\text{sign}(P_2)}{|\sin(2\theta)| + |\cos(2\theta)|}$$

The first absolute value adder 6 is used to obtain the sum of the absolute values of $Q_1$ and $P_1$ to obtain the first-order absolute harmonic signal amplitude $T_1$. Likewise, the second absolute value adder 7 is used to obtain the sum of the absolute values of $Q_2$ and $P_2$ to obtain the second-order absolute harmonic signal amplitude $T_2$, and the formula is as follows:

$$T_1 = |Q_1| + |P_1| = AJ_1(m)(|\sin(\theta)| + |\cos(\theta)|)|\sin(\varphi)|$$

$$T_2 = |Q_2| + |P_2| = AJ_2(m)(|\sin(2\theta)| + |\cos(2\theta)|)|\cos(\varphi)|$$

The third multiplier 8 and the fourth multiplier 9 are used to multiply the first- and second-order phase delay correction coefficients by the first- and second-order absolute harmonic amplitude signal amplitudes respectively to obtain a first-order new harmonic amplitude orthogonal signal $R_1$ and a second-order new harmonic amplitude orthogonal signal $R_2$ that compensate for the phase delay, and the formula is as follows:

$$R_1 = G_1 T_1 = AJ_1(m)\sin \varphi(t)$$

$$R_2 = G_2 T_2 = AJ_2(m)\cos \varphi(t)$$

The first arc tangent operator 10 is used to perform a four-quadrant arc tangent operation on the new harmonic amplitude orthogonal signals ($R_2$, $R_2$) after compensating for the phase delay to obtain the phase $\varphi$ to be measured, and the formula is as follows:

$$\varphi = \begin{cases} \arctan\dfrac{R_1}{R_2}, & \text{sign}(R_2) \geq 0 \\ \arctan\dfrac{R_1}{R_2} - \pi, & \text{sign}(R_2) < 0, \text{sign}(R_1) < 0 \\ \arctan\dfrac{R_1}{R_2} + \pi, & \text{sign}(R_2) < 0, \text{sign}(R_1) \geq 0 \end{cases}$$

Figure 2:
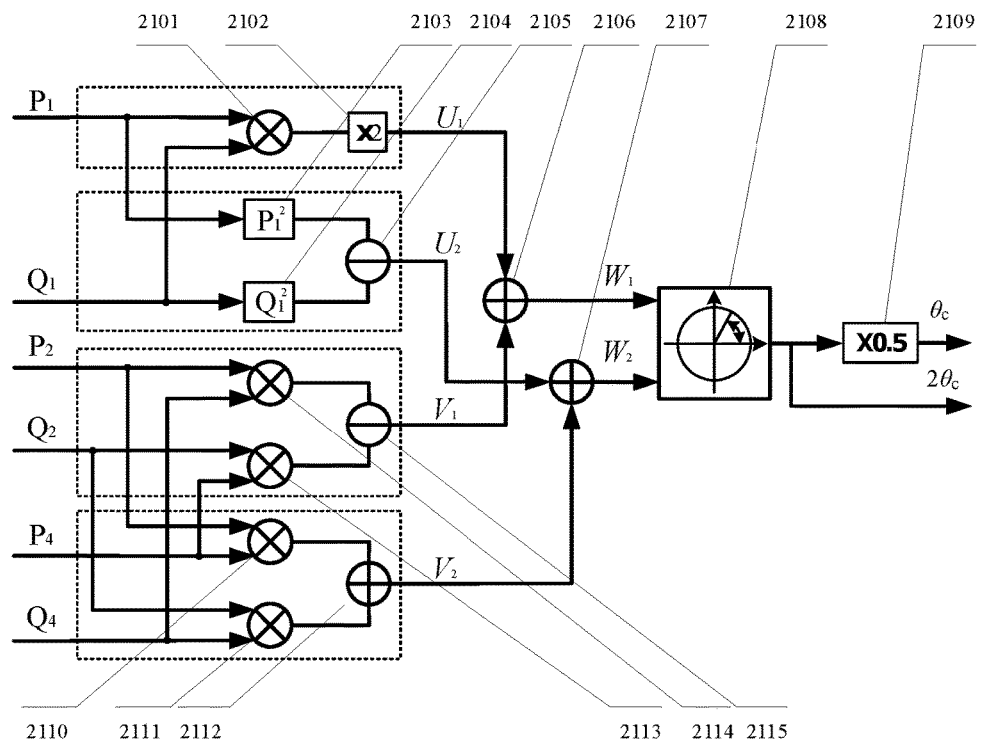
FIG. 2 is a functional block diagram of the phase delay extraction module.

As shown in FIG. 2, this module is a principle block diagram of the phase delay extraction module. The method of signal processing in the phase delay extraction module 21 in FIG. 1 is further explained. The input terminal of the ninth multiplier 2101 is connected to the output terminals of the first low-pass filter 4 and the second low-pass filter 5 respectively. The output terminal of the first low-pass filter 4 is also connected to the input terminal of the first squarer 2103. The output terminal of the ninth multiplier 2101 is connected to the input terminal of the first adder 2106 through the times multiplier 2102.

The output terminal of the second low-pass filter 5 is also connected to the input terminal of the second squarer 2104, and the output terminal of the second squarer 2104 and the output terminal of the first squarer 2103 are altogether connected to the input terminal of the second adder 2107 through the first subtractor 2105.

The input terminal of the thirteenth multiplier 2114 is connected to the output terminals of the third low-pass filter 11 and the sixth low-pass filter 20 respectively. The input terminal of the twelfth multiplier 2113 is connected to the output terminals of the fourth low-pass filter 15 and the fifth low-pass filter 19 respectively. The output terminals of the twelfth multiplier 2113 and the thirteenth multiplier 2114 are connected to the input terminal of the first adder 2106 through the second subtractor 2115.

The input terminal of the tenth multiplier 2110 is connected to the output terminals of the third low-pass filter 11 and the fifth low-pass filter 19 respectively. The input terminal of the eleventh multiplier 2111 is connected to the output terminals of the fourth low-pass filter 15 and the sixth low-pass filter 20 respectively. The output terminals of the tenth multiplier 2110 and the eleventh multiplier 2111 are connected to the input terminal of the second adder 2107 through the third adder 2112.

The output terminals of the first adder 2106 and the second adder 2107 are both connected to the input terminal of the second arc tangent operator 2108. The output terminal of the second arc tangent operator 2108 is divided into two paths, the first branch is output to the phase delay correction coefficient calculation module 22 through the halve operator 2109, and the second branch directly outputs the result to the phase delay correction coefficient calculation module 22.

The ninth multiplier 2101 is used to multiply the first-order orthogonal harmonic amplitude signals $P_1$ and $Q_1$, and the product is amplified by the times multiplier 2102 by two times to obtain the signal $U_1$, and the formula is as follows:

$$\begin{aligned} U_1 &= 2P_1 Q_1 \\ &= 2\sin(\theta)\cos(\theta)A^2 J_1^2(m)\sin^2(\varphi) \\ &= A^2 J_1^2(m)\sin^2(\varphi)\sin(2\theta). \end{aligned}$$

In the meantime, the first squarer 2103 and the second squarer 2104 perform square operations on the first-order orthogonal amplitude signals ($P_1$, $Q_1$) respectively, and then a subtraction operation is performed through the first subtractor 2105 to obtain the signal $U_2$, and the formula is as follows:

$$\begin{aligned} U_2 &= P_1^2 - Q_1^2 \\ &= [\cos^2(\theta) - \sin^2(\theta)]A^2 J_1^2(m)\sin^2(\varphi) \\ &= A^2 J_1^2(m)\sin^2(\varphi)\cos(2\theta) \end{aligned}$$

Obviously, the amplitudes of the signals ($U_1$, $U_2$) are all equal to $A^2 [J_1(m)]^2 \sin^2(\varphi)$. The amplitude is related to the phase $\varphi$ to be measured. Only when $\varphi = j\pi + \pi/2$ (j is any integer), the signals ($U_1$, $U_2$) are all zero. Under the circumstances, this signal cannot be directly used to calculate the phase delay value. To address the issue, the present disclosure constructs another pair of signals ($V_1$, $V_2$) of which the amplitude is greater than zero in this case. The thirteenth multiplier 2114 is used to multiply the signal $P_2$ and $Q_4$, the twelfth multiplier 2113 is used to multiply the signal $Q_2$ and $P_4$, and the second subtractor 2115 is used to perform subtraction on the product $P_2 Q_4$ and $Q_2 P_4$ to obtain the signal $V_1$, and the formula is as follows:

$$\begin{aligned} V_1 &= P_2 Q_4 - Q_2 P_4 \\ &= [\cos(2\theta)\sin(4\theta) - \sin(2\theta)\cos(4\theta)]A^2 J_2(m)J_4(m)\cos^2(\varphi) \\ &= A^2 J_2(m)J_4(m)\cos^2(\varphi)\sin(2\theta) \end{aligned}$$

In the meantime, the tenth multiplier 2110 is used to multiply the signals $P_2$ and $P_4$, the eleventh multiplier 2111 is used to multiply the signals $Q_2$ and $Q_4$, and the product $P_2P_4$ and $Q_2Q_4$ are added through the third adder 2112 to obtain the signal $V_2$, and the formula is as follows:

$$V_2 = P_2P_4 + Q_2Q_4$$
$$= [\cos(2\theta)\cos(4\theta) + \sin(2\theta)\sin(4\theta)]A^2 J_2(m) J_4(m) \cos^2(\varphi)$$
$$= A^2 J_2(m) J_4(m) \cos^2(\varphi) \cos(2\theta)$$

Obviously, the amplitudes of the signals ($V_1$, $V_2$) are equal to $A^2 J_2(m) J_4(m) \cos^2(\varphi)$, and the amplitude is related to the phase $\varphi$ to be measured. Only when $\varphi=2j\pi$ (j is any integer), the signals ($V_1$, $V_2$) are all zero. Under the circumstances, this formula cannot be used to directly calculate the phase delay value.

The amplitude of the two pairs of signals ($U_1$, $U_2$) and ($V_1$, $V_2$) will be affected by the phase to be measured; but when the amplitude of the signals ($U_1$, $U_2$) is zero, the amplitude of the signals ($V_1$, $V_2$) is greater than zero. When the amplitude of the signals ($U_1$, $U_2$) is zero, the amplitude of the signals ($V_1$, $V_2$) is greater than zero, that is, the amplitudes of the two will not be zero at the same time. Therefore, combining the two pairs of signals can construct a phase delay calculation method that is not affected by the phase to be measured. The first adder 2106 is used to obtain the sum of $U_1$ and $V_1$ to obtain a phase delay sine signal $W_1$ of whose amplitude is always greater than zero; the second adder 2107 is used to obtain the sum of $U_2$ and $V_2$ to obtain a phase delay cosine signal $W_2$ of whose amplitude is always greater than zero, and the formula is as follows respectively:

$$W_1 = U_1 + V_1$$
$$= A^2[J_1^2(m)\sin^2(\varphi) + J_2(m)J_4(m)\cos^2(\varphi)]\sin 2\theta$$
$$W_2 = U_2 + V_2$$
$$= A^2[J_1^2(m)\sin^2(\varphi) + J_2(m)J_4(m)\cos^2(\varphi)]\cos 2\theta$$

The phase delay signals ($W_1$, $W_2$) is always greater than zero regardless of the value of the phase to be measured. The arc tangent operation is performed by the second arc tangent operator 2108 to obtain a double phase delay amount $2\theta_c$. A halve operator 2109 is used to multiply the double phase delay amount $2\theta_c$ by 0.5, and finally obtains the phase delay amount $\theta_c$, and the formula is as follows:

$$\theta_c = \frac{1}{2}\arctan\frac{W_1}{W_2}$$
$$= \frac{1}{2}\arctan\frac{2P_1Q_1 + (P_2Q_4 - Q_2P_4)}{(P_1^2 - Q_1^2) + (P_2P_4 + Q_2Q_4)}$$
$$= \frac{1}{2}\arctan\frac{A^2[J_1^2(m)\sin^2(\varphi) + J_2(m)J_4(m)\cos^2(\varphi)]\sin 2\theta}{A^2[J_1^2(m)\sin^2(\varphi) + J_2(m)J_4(m)\cos^2(\varphi)]\cos 2\theta}$$
$$= \frac{1}{2}\arctan\frac{\sin 2\theta}{\cos 2\theta}$$

In this phase delay calculation method, the numerator and denominator are always greater than zero regardless of the value of the phase to be measured, that is, they are not affected by the phase to be measured, and the phase delay value can be accurately extracted when the phase to be measured is at any angle. Assume that the actual phase delay value is in the range of $-\pi$ to $\pi$. The relationship between the phase delay amount $\theta_c$ extracted by the above formula and the actual phase delay $\theta$ is $\theta=\theta_c \pm k\pi$ (k=−1, 0, 1).

Figure 3:
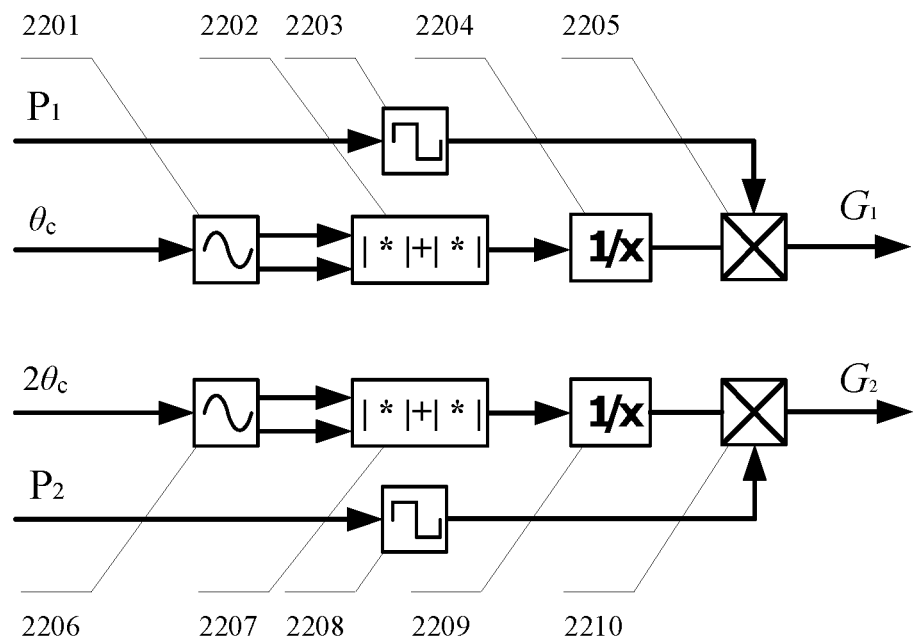
FIG. 3 is a principle block diagram of the phase delay correction coefficient calculation module.

As shown in FIG. 3, this module is a principle block diagram of the phase delay correction coefficient calculation module, that is, the method for signal processing in the phase delay correction coefficient calculation module 22 in FIG. 1 is further explained.

The output terminal of the first branch of the second arc tangent operator 2108 obtains the sine value and the cosine value through the first cosine lookup table 2201, and the two values are sequentially connected to the input terminal of the first sign multiplier 2205 through the third absolute value adder 2202 and the first reciprocal operator 2204. The first sign multiplier 2205 calculates an output value from the first reciprocal operator 2204 and an output value obtained by the second low-pass filter 5 through the first sign operator 2203 to output the operation result.

The output terminal of the second branch of the second arc tangent operator 2108 obtains the sine value and the cosine value through the second cosine lookup table 2206, and the two values are sequentially connected to the input terminal of the second sign multiplier 2210 through the fourth absolute value adder 2207 and the second reciprocal operator 2209. The second sign multiplier 2210 calculates an output value from the second reciprocal operator 2209 and an output value obtained by the third low-pass filter 11 through the second sign operator 2208 to output the operation result.

The absolute harmonic amplitude signals ($T_1$, $T_2$) shows that the existed phase delay error terms are |sin θ|+|cos θ| and |sin 2θ|+|cos 2θ| respectively. To compensate for it, the phase delay amount $\theta_c$ calculated above is used to calculate the reciprocal values of these two error terms, and then multiply them by the corresponding absolute harmonic amplitude signals ($T_1$, $T_2$) to compensate for the effect caused by the phase delay. First, the first cosine lookup table 2201 is used to obtain the sine and cosine values (sin $\theta_c$, cos $\theta_c$) of the phase delay amount, and the second cosine lookup table 2206 is used to obtain the sine value and cosine value (sin $2\theta_c$, cos $2\theta_c$) of the doubled phase delay amount. The sum (|sin $\theta_c$|+|cos $\theta_c$|) of the absolute values of the sine and cosine values of the phase delay amount is obtained through the third absolute value adder 2202, and the sum (|sin $2\theta_c$|+|cos $2\theta_c$|) of the absolute values of the sine and cosine values of the doubled phase delay amount is obtained through the fourth absolute value adder 2207. The reciprocal of |sin $\theta_c$|+|cos $\theta_c$| is calculated through the first reciprocal operator 2204, and then multiplied by the sign calculated by the first sign operator 2203 through the first sign multiplier 2205 to finally obtain the first-order absolute harmonic amplitude signal phase delay correction coefficient $G_1$, and the formula is as follows:

$$G_1 = \frac{\text{sign}(P_1)}{|\sin(\theta_c)| + |\cos(\theta_c)|} = \frac{\text{sign}(P_1)}{|\sin(\theta)| + |\cos(\theta)|}$$

In the meantime, the reciprocal of |sin $2\theta_c$|+|cos $2\theta_c$| is calculated through the second reciprocal operator 2209, and then multiplied by the sign calculated by the second sign operator 2208 through the second sign multiplier 2210 to finally obtain a first-order absolute harmonic amplitude signal phase delay correction coefficient $G_2$, and the formula is as follows:

$$G_2 = \frac{\text{sign}(P_2)}{|\sin(2\theta_c)| + |\cos(2\theta_c)|} = \frac{\text{sign}(P_2)}{|\sin(2\theta)| + |\cos(2\theta)|}$$

Combining the properties of the trigonometric function, the average denominators of the correction coefficients $G_1$ and $G_2$ range from 1 to root 2, which avoids the situation where the reciprocal operation cannot be calculated when the denominator is zero.

Figure 4:
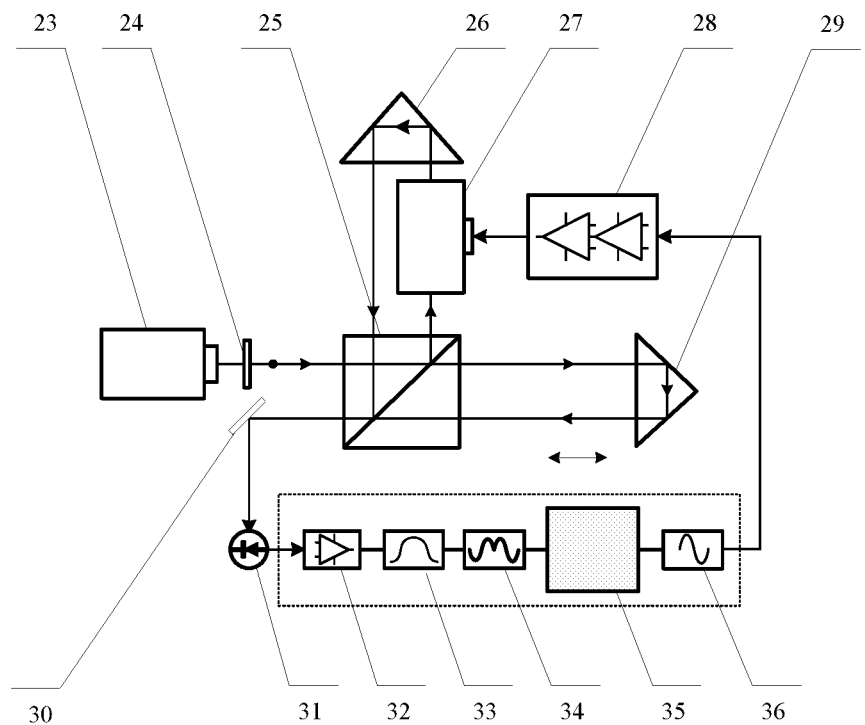
FIG. 4 is a schematic diagram of a system applied in a sinusoidal phase modulation interferometer of the present disclosure.

As shown in FIG. 4, the single-frequency laser 23, the polarizer 24, the beam splitting prism 25, and the measuring cube prism 29 are arranged at intervals along a straight line. On one side of the beam splitting prism 25, a reference cube prism 26 is placed, and on the other side of the beam splitting prism 25 a reflecting mirror 30 is placed. One side of the reflecting mirror 30, a photodetector 31 is placed. The photodetector 31 is sequentially connected to the amplifier 32, the band-pass filter 33, the analog-to-digital converter 34, the field programmable gate array signal processor (FPGA) 35 and the digital-to-analog converter 36. The digital-to-analog converter 36 is connected to the electro-optic phase modulator 27 through the high-voltage amplifier 28.

In specific implementation, the wavelength of the single-frequency laser 23 is 780 nm; the highest modulation frequency of the electro-optic phase modulator 27 is 1 MHz; the bandwidth of the photodetector 31 is 10 MHz; the band-pass filter 33 of the interference signal is composed of one DC filter and one low-pass filter with a cutoff frequency of 10 MHz; the sampling frequency of the analog-to-digital converter 34 is 125 MHz; the sampling frequency of the -digital-to analog converter is 125 MHz; the high performance FPGA 35 is XC7K160T.

The laser emitted from the single-frequency laser 23 is linearly polarized laser perpendicular to the paper surface after passes through the polarizer 24. The linearly polarized laser is divided into two beams by the beam splitting prism 25, wherein the transmitted one is measurement laser and the reflected one is reference laser. The measurement laser is reflected to the beam splitting prism 25 by the measuring cube prism 29. When the measurement laser travels back and forth, the phase of the measurement laser changes. This phase change is proportional to the distance from the beam splitting prism 25 to the measuring cube prism 29, that is, the phase change amount is the phase to be measured. The sinusoidal modulation signal generated by FPGA 35 is converted into an analog sinusoidal modulation signal by the digital-to-analog converter 36 and amplified by the high-voltage amplifier 28. Finally, the electro-optic modulator 27 is driven and generates sinusoidal phase modulation to the reference laser. The frequency of the sinusoidal modulation signal is set to 200 kHz. The amplitude of the sinusoidal modulation signal determines the magnitude of the modulation depth. In this example, the amplitude of the sinusoidal modulation signal is precisely adjusted to ensure that the modulation depth maintains 2.63 radians (on this occasion $J_1(m)=J_2(m)$). That is, there is no need to worry about the effect caused by the modulation depth in subsequent procedure. The reference laser after sinusoidal phase modulation is reflected by the reference cube prism 26 and returns to the beam splitting prism 25.

The measurement laser and reference laser returned to the beam splitting prism 25 are converged and then reflected to the photodetector 31 by the reflecting mirror 30. The photodetector 31 generates a sinusoidal phase modulation interference signal, which is amplified by the amplifier 32, filtered by the band-pass filter 33 is and then sampled and converted into the digital interference signal by the analog-to-digital converter 34. There is a certain phase delay in the phase modulation process, which is the main source of the carrier phase delay in the PGC phase demodulation technology. The formula of the digital interference signal including the carrier phase delay is as follows:

$$S(t) = A\cos(\varphi)\left\{J_0(m) + 2\sum_{n=1}^{\infty} J_{2n}(m)\cos[2n(\omega_c t + \theta)]\right\} - A\sin(\varphi)\left\{2\sum_{n=1}^{\infty} J_{2n-1}(m)\sin[(2n-1)(\omega_c t + \theta)]\right\}$$

Then the digital interference signal generated by the analog-to-digital converter 34 inputs to the FPGA 35. The FPGA 35 implements the phase delay extraction and compensation method in the PGC phase demodulation technology shown in FIG. 1, and finally accurately obtains the phase to be measured.

Figure 5:
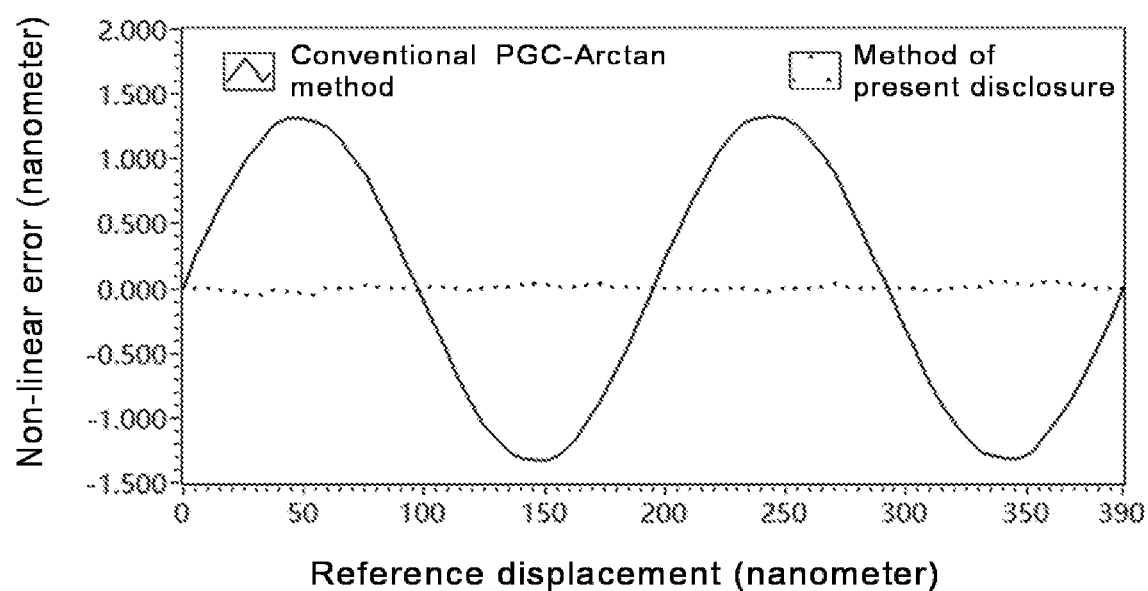
FIG. 5 is a graph of the results of simulation experiments of the present disclosure.

As shown in FIG. 5, in the simulation case, according to the formula of the digital interference signal S(t), the signal source is used to generate the same simulated sinusoidal phase modulation interference signal, wherein the modulation depth is set to 2.63 and the phase delay is set to 10°. The analog sinusoidal phase modulation interference signal is transmitted to the signal processing board corresponding to FIG. 1, and the phase delay extraction and compensation method in the PGC phase demodulation technology provided by the present disclosure is completed in FPGA 35, and finally the experimental data shown in FIG. 5 is obtained. In FIG. 5, the solid line represents the error between the reference displacement and the data measured by the traditional PGC-Arctan phase demodulation algorithm, which does not compensate for the phase delay. Obviously, the nonlinear error is almost sinusoidally, and the peak-to-peak value is about 2.7 nanometers. The dotted line shows the error between the reference displacement and the data measured through the phase delay extraction and compensation method provided by the present disclosure. Obviously, there is no non-linear error in the result, and the overall result is white noise with a peak-to-peak value of 0.1 nm. The experimental data shows that the phase delay extraction and compensation method by the present disclosure can effectively eliminate the non-linear error caused by the phase delay.

In summary, the method of the present disclosure well utilizes the first-order, second-order, and fourth-order orthogonal harmonic amplitude signals to extract the phase delay, and uses it to calculate the corresponding phase delay correction coefficient to compensate for the effect caused by the phase delay, thereby eliminating the non-linear errors caused by phase delay and improving phase measurement accuracy.

The above specific embodiments are used to explain the present disclosure instead of limiting the present disclosure. Within the spirit of the present disclosure and the protection scope of the claims, any modification and change made to the present disclosure falls within the protection scope of the present disclosure.

What is claimed is:

1. A phase delay extraction and compensation method in a phase generation carrier (PGC) phase demodulation technology, comprising the following steps:

emitting, from a single-frequency laser of a sinusoidal phase modulation interferometer, a laser beam, wherein the laser beam passes through a polarizer of the sinusoidal phase modulation interferometer, wherein the laser beam is reflected and transmitted by a beam splitting prism of the sinusoidal phase modulation interferometer as a reflected light and a transmitted light;

modulating, by an electro-optic phase modulator of the sinusoidal phase modulation interferometer, the reflected light;

reflecting, by a reference cube prism of the sinusoidal phase modulation interferometer, the modulated reflected light;

reflecting, by a measuring cube prism of the sinusoidal phase modulation interferometer, the transmitted light to the beam splitting prism;

converging, by the beam splitting prism, the modulated reflected light and the transmitted light as a converged light;

reflecting, by a reflecting mirror of the sinusoidal phase modulation interferometer, the converged light to a photodetector of the sinusoidal phase modulation interferometer;

generating, by the photodetector, a sinusoidal phase modulation interference signal in response to the converged light;

sequentially processing the sinusoidal phase modulation interference signal by an amplifier, a band-pass filter and an analog-to-digital converter to generate a filtered sinusoidal phase modulation interference signal;

sampling the filtered sinusoidal phase modulation interference signal to obtain a digital interference signal S(t), wherein t represents time, and the digital interference signal S(t) is expressed as follows:

$$S(t) = A\cos(\varphi)\left\{J_0(m) + 2\sum_{n=1}^{\infty} J_{2n}(m)\cos[2n(\omega_c t + \theta)]\right\} - A\sin(\varphi)\left\{2\sum_{n=1}^{\infty} J_{2n-1}(m)\sin[(2n-1)(\omega_c t + \theta)]\right\}$$

wherein A represents the amplitude of the digital interference signal, m represents a modulation depth, θ represents a phase delay, $\omega_c$ represents the frequency of a sinusoidal modulation signal, φ represents a phase to be measured, and $J_0(m)$ represents a $0^{th}$ order Bessel Function of the first kind, $J_{2n}(m)$ represents an even order Bessel function of the first kind, and $J_{2n-1}(m)$ represents an odd order Bessel function of the first kind;

generating, by a plurality of digital frequency synthesizers, a plurality of orthogonal reference signals, wherein the orthogonal reference signals comprise $\sin(\omega_c t)$, $\cos(\omega_c t)$, $\sin(\omega_c t)$, $\cos(2\omega_c t)$, $\sin(4\omega_c t)$, and $\cos(4\omega_c t)$;

multiplying, by a plurality of multipliers, the digital interference signal S(t) with each of the orthogonal reference signals to obtain a plurality of frequency-mixing signals, wherein the frequency-mixing signals comprise $S(t)\sin(\omega_c t)$, $S(t)\cos(\omega_c t)$, $S(t)\sin(2\omega_c t)$, $S(t)\cos(2\omega_c t)$, $S(t)\sin(4\omega_c t)$, and $S(t)\cos(4\omega_c t)$;

performing, by a plurality of low-pass filters, a low-pass filtering process to each of the frequency-mixing signals and accordingly obtaining first-order orthogonal harmonic amplitude signals $(P_1, Q_1)$, second-order orthogonal harmonic amplitude signals $(P_2, Q_2)$ and fourth-order orthogonal harmonic amplitude signals $(P_4, Q_4)$, wherein $P_1, Q_1, P_2, Q_2, F_4, Q_4$ are calculated as:

$P_1 = -LPF[S(t)\cdot\sin(\omega_c t)] = AJ_1(m)\cos(\theta)\sin(\varphi)$ $Q_1 = -LPF[S(t)\cdot\cos(\omega_c t)] = AJ_1(m)\sin(\theta)\sin(\varphi)$ $P_2 = +LPF[S(t)\cdot\cos(2\omega_c t)] = AJ_2(m)\cos(2\theta)\cos(\varphi)$ $Q_2 = -LPF[S(t)\cdot\sin(2\omega_c t)] = AJ_2(m)\sin(2\theta)\cos(\varphi)$ $P_4 = +LPF[S(t)\cdot\cos(4\omega_c t)] = AJ_4(m)\cos(4\theta)\cos(\varphi)$ $Q_4 = -LPF[S(t)\cdot\sin(4\omega_c t)] = AJ_4(m)\sin(4\theta)\cos(\varphi)$ wherein LPF[ ] represents the low-pass filtering process, $J_1(m)$ represents a first-order Bessel Function of the first kind, $J_2(m)$ represents a second-order Bessel function of the first kind, $J_4(m)$ represents a fourth-order Bessel function of the first kind;

utilizing the first-order orthogonal harmonic amplitude signals $(P_1, Q_1)$, the second-order orthogonal harmonic amplitude signals $(P_2, Q_2)$, and the fourth-order orthogonal harmonic amplitude signals $(P_4, Q_4)$ to obtain a phase delay amount $\theta_c$, wherein the phase delay amount $\theta_c$ is calculated as:

$$\theta_c = \frac{1}{2}\arctan\frac{2P_1Q_1 + (P_2Q_4 - Q_2P_4)}{(P_1^2 - Q_1^2) + (P_2P_4 + Q_2Q_4)}$$
$$= \frac{1}{2}\arctan\frac{A^2[J_1^2(m)\sin^2(\varphi) + J_2(m)J_4(m)\cos^2(\varphi)]\sin 2\theta}{A^2[J_1^2(m)\sin^2(\varphi) + J_2(m)J_4(m)\cos^2(\varphi)]\cos 2\theta}$$
$$= \frac{1}{2}\arctan\frac{\sin 2\theta}{\cos 2\theta};$$

obtaining a first absolute harmonic amplitude signal by adding up, by a first absolute value adder, the absolute values of the first-order orthogonal harmonic amplitude signals $(P_1, Q_1)$, wherein the first absolute harmonic amplitude signal is represented by $T_1$;

obtaining a second absolute harmonic amplitude signal by adding up, by a second absolute value adder, the absolute values of the second-order orthogonal harmonic amplitude signals $(P_2, Q_2)$, wherein the second absolute harmonic amplitude signal is represented by $T_2$, wherein $T_1$ and $T_2$ are calculated as:

$T_1 = |Q_1| + |P_1| = AJ_1(m)(|\sin(\theta)| + |\cos(\theta)|)|\sin(\varphi)|$ $T_2 = |Q_2| + |P_2| = AJ_2(m)(|\sin(2\theta)| + |\cos(2\theta)|)|\cos(\varphi)|$;

calculating a first ukase delay correction coefficient and a second phase delay correction coefficient based on the phase delay amount $\theta_c$, wherein the first phase delay correction coefficient and the second phase delay correction coefficient are respectively represented by $G_1$ and $G_2$ and calculated as:

$$G_1 = \frac{\text{sign}(P_1)}{|\sin(\theta_c)| + |\cos(\theta_c)|}$$

-continued $$G_2 = \frac{\text{sign}(P_2)}{|\sin(2\theta_c)| + |\cos(2\theta_c)|}$$

wherein sign($P_1$) and sign($P_2$) represent the signs of $P_1$ and $P_2$, respectively;

obtaining a first new harmonic amplitude signal by multiplying the first phase delay correction coefficient with the first absolute harmonic amplitude signal;

obtaining a second new harmonic amplitude signal by multiplying the second phase delay correction coefficient with the second absolute harmonic amplitude signal, wherein the first new harmonic amplitude signal and the second new harmonic amplitude signal are respectively represented by $R_1$ and $R_2$ and calculated as:

$$R_1 = G_1 T_1 = A J_1(m) \sin(\varphi)$$

$$R_2 = G_2 T_2 = A J_2(m) \cos(\varphi)$$

obtaining the phase to be measured by performing a quadrant arc tangent operation on the first new harmonic amplitude signal and the second new harmonic amplitude signal, wherein the quadrant arc tangent operation is characterized as:

$$\varphi = \begin{cases} \arctan\frac{R_1}{R_2}, & \text{sign}(R_2) \geq 0 \\ \arctan\frac{R_1}{R_2} - \pi, & \text{sign}(R_2) < 0, \text{sign}(R_1) < 0 \\ \arctan\frac{R_1}{R_2} + \pi, & \text{sign}(R_2) < 0, \text{sign}(R_1) \geq 0 \end{cases}$$

wherein sign($R_1$) and sign($R_2$) represent the signs of $R_1$ and $R_2$, respectively.

2. A phase processing system for performing the phase delay extraction and compensation method of claim 1, wherein the phase processing system comprises:

the plurality of multipliers, comprising a first multiplier, a second multiplier, a fifth multiplier, a sixth multiplier, a seventh multiplier, and an eighth multiplier, wherein input terminals of the first multiplier, the second multiplier, the fifth multiplier, the sixth multiplier, the seventh multiplier, and the eighth multiplier are all connected to the digital interference signal S(t);

the plurality of digital frequency synthesizers, comprising a first digital frequency synthesizer, a second digital frequency synthesizer, and a third digital frequency synthesizer, wherein the first digital frequency synthesizer is connected to the input terminals of the first multiplier and the second multiplier, the second digital frequency synthesizer is connected to the input terminals of the fifth multiplier and the sixth multiplier, and the third digital frequency synthesizer is connected to the input terminals of the seventh multiplier and the eighth multiplier;

the plurality of low-pass filters, comprising a first low-pass filter, a second low-pass filter, a third low-pass filter, a fourth low-pass filter, a fifth low-pass filter and a sixth low-pass filter;

the first absolute value adder;

the second absolute value adder;

a phase delay extraction circuit;

a phase delay correction coefficient calculation circuit;

a first arc tangent operator;

wherein an output terminal of the first multiplier is connected to an input terminal of the first absolute value adder and an input terminal of the phase delay extraction circuit respectively through the first low-pass filter, wherein an output terminal of the second multiplier is connected to the input terminal of the first absolute value adder and the input terminal of the phase delay extraction circuit respectively through the second low-pass filter, wherein an output terminal of the fifth multiplier is connected to an input terminal of a second absolute value adder and the input terminal of the phase delay extraction circuit respectively through the third low-pass filter, wherein an output terminal of the sixth multiplier is connected to the input terminal of the second absolute value adder and the input terminal of the phase delay extraction circuit respectively through the fourth low-pass filter, wherein output terminals of the seventh multiplier and the eight multiplier are respectively connected to the input terminal of the phase delay extraction circuit through the fifth low-pass filter and the sixth low-pass filter respectively, wherein an output terminal of the phase delay extraction circuit is connected to an input terminal of the phase delay correction coefficient calculation circuit, an output terminal of the first absolute value adder and an output terminal of the phase delay correction coefficient calculation circuit are connected to an input terminal of the first arc tangent operator through the third multiplier, wherein an output terminal of the second absolute value adder and the output terminal of the phase delay correction coefficient calculation circuit are connected to the input terminal of the first arc tangent operator through the fourth multiplier, and an output terminal of the first arc tangent operator outputs the phase to be measured.

3. The phase processing system according to claim 2, further comprising:

a ninth multiplier, wherein an input terminal of the ninth multiplier is connected to output terminals of the first low-pass filter and the second low-pass filter respectively;

a first squarer, wherein the output terminal of the first low-pass filter is also connected to an input terminal of the first squarer;

a first adder, wherein an output terminal of the ninth multiplier is connected to an input terminal of the first adder through a times multiplier;

a second squarer, wherein the output terminal of the second low-pass filter is also connected to an input terminal of the second squarer a first subtractor;

a second subtractor;

a second adder, wherein an output terminal of the first squarer and the output of the second squarer are altogether connected to an input terminal of the second adder through the first subtractor;

a tenth multiplier, wherein an input terminal of the tenth multiplier is connected to the output terminals of the third low-pass filter and the fifth low-pass filter respectively;

an eleventh multiplier, wherein an input terminal of the eleventh multiplier is connected to output terminals of the fourth low-pass filter and the sixth low-pass filter respectively;

a twelfth multiplier;

a thirteenth multiplier, wherein an input terminal of the thirteenth multiplier is connected to output terminals of the third low-pass filter and the sixth low-pass filter respectively, an input terminal of the twelfth multiplier is connected to output terminals of the fourth low-pass filter and the fifth low-pass filter respectively, output terminals of the twelfth multiplier and the thirteenth multiplier are connected to the input terminal of the first adder through the second subtractor;

a third adder, wherein output terminals of the tenth multiplier and the eleventh multiplier are connected to the input terminal of the second adder through the third adder;

a second arc tangent operator, wherein output terminals of the first adder and the second adder are both connected to an input terminal of the second arc tangent operator, a halve operator, wherein an output terminal of the second arc tangent operator is divided into a first branch and a second branch, the first branch is output to the phase delay correction coefficient calculation circuit through the halve operator, and the second branch directly outputs a result to the phase delay correction coefficient calculation circuit.

4. The phase processing system according to claim 3, wherein the phase delay correction coefficient calculation circuit comprises:

a first sign multiplier;

a third absolute value adder;

a first reciprocal operator, wherein an output terminal of the halve operator of the first branch of the second arc tangent operator obtains a sine value and a cosine value through a first cosine lookup table, and the sine value and the cosine value obtained through the first cosine lookup table are sequentially connected to an input terminal of the first sign multiplier through the third absolute value adder and the first reciprocal operator;

a first sign operator, wherein the first sign multiplier calculates an output value from the first reciprocal operator and an output value obtained by the second low-pass filter through the first sign operator to output an operation result;

a second sign multiplier;

a fourth absolute value adder;

a second reciprocal operator, wherein an output terminal of the second branch of the second arc tangent operator obtains a sine value and a cosine value through a second cosine lookup table, and the sine value and the cosine value obtained through the second cosine lookup table are sequentially connected to an input terminal of the second sign multiplier through the fourth absolute value adder and the second reciprocal operator;

a second sign operator, wherein the second sign multiplier calculates an output value from the second reciprocal operator and an output value obtained by the third low-pass filter through the second sign operator to output an operation result.

5. The phase processing system according to claim 2, wherein the phase processing system is implemented by a field programmable gate array (FPGA) signal processor, wherein the FPGA signal processor obtains the phase to be measured in response to the filtered sinusoidal phase modulation interference signal, wherein the FPGA signal processor outputs a sinusoidal modulation signal to a control terminal of the electro-optic phase modulator through a digital-to-analog converter of the sinusoidal phase modulation interferometer and a high-voltage amplifier of the sinusoidal phase modulation interferometer in sequence, wherein the sinusoidal modulation signal triggers the electro-optic phase modulator to modulate the reflected light.

* * * * *